United States Patent [19]

Papai et al.

[11] Patent Number: 5,735,565
[45] Date of Patent: Apr. 7, 1998

[54] BEDLINER CONVERSION UNIT FOR PICKUP TRUCK

[75] Inventors: Joseph A. Papai, Birmingham; Clifford Wilkins, Rochester Hills, both of Mich.

[73] Assignee: Chrysler Corporation, Auburn Hills, Mich.

[21] Appl. No.: 639,390

[22] Filed: Apr. 29, 1996

[51] Int. Cl.⁶ .................................................. B60R 13/01
[52] U.S. Cl. .................... 296/39.2; 296/26; 296/165; 296/183
[58] Field of Search ........................... 296/39.1, 39.2, 296/183, 26, 165

[56] References Cited

U.S. PATENT DOCUMENTS

| | | | |
|---|---|---|---|
| 2,816,794 | 12/1957 | Temp | 296/183 X |
| 3,145,046 | 8/1964 | Orn et al. | 296/26 |
| 3,881,768 | 5/1975 | Nix . | |
| 4,103,958 | 8/1978 | Parent | 296/26 X |
| 4,201,413 | 5/1980 | Rowe | 296/165 |
| 4,603,901 | 8/1986 | McIntosh et al. | 296/165 |
| 4,771,507 | 9/1988 | Draplin et al. | 16/297 |
| 4,861,096 | 8/1989 | Hastings | 296/183 |
| 4,930,836 | 6/1990 | Grinn | 296/183 X |
| 4,981,319 | 1/1991 | Gerzeny et al. | 296/26 |
| 5,288,124 | 2/1994 | Ward | 296/183 |
| 5,305,512 | 4/1994 | Ward | 296/183 X |
| 5,316,358 | 5/1994 | Payne et al. | 296/37.6 |

Primary Examiner—Dennis H. Pedder
Attorney, Agent, or Firm—Thomas G. Pasternak

[57] ABSTRACT

A conversion unit for a pickup truck long-cab chassis frame, modified to support a regular cab, thereby providing a frame clear length of almost two feet between the cab rear wall and an open front end of the cargo bed. The conversion unit includes a plastic bedliner portion, defined by bottom and opposed side panels, and a self-supporting, integral, forward extension portion defined by an extended bottom panel portion, extended side panel portions, and a front panel upstanding from the forward end of the extended bottom panel portion. A metal framework, embedded in the plastic extension portion, is adapted to be secured to the frame clear extension portion, providing an extra-long composite cargo bed. A second embodiment of the unit provides a lower-half opening in one side of the extension portion, adapted for closure by a downwardly opening lower hatch swingably supported on the framework. A camper shell and expandable roof cap enclosure assembly, adapted to be removably supported on the unit, includes an upper-half opening in a shell side wall, adapted for closure by an upwardly opening upper hatch swingably supported on the shell, positioned in matching alignment with the lower hatch. Upon each hatch being moved to its open mode, the resulting full height opening cooperates with the expanded roof cap, whereby sufficient headroom is provided allowing a six-foot person to easily board the conversion unit enclosure assembly.

17 Claims, 6 Drawing Sheets

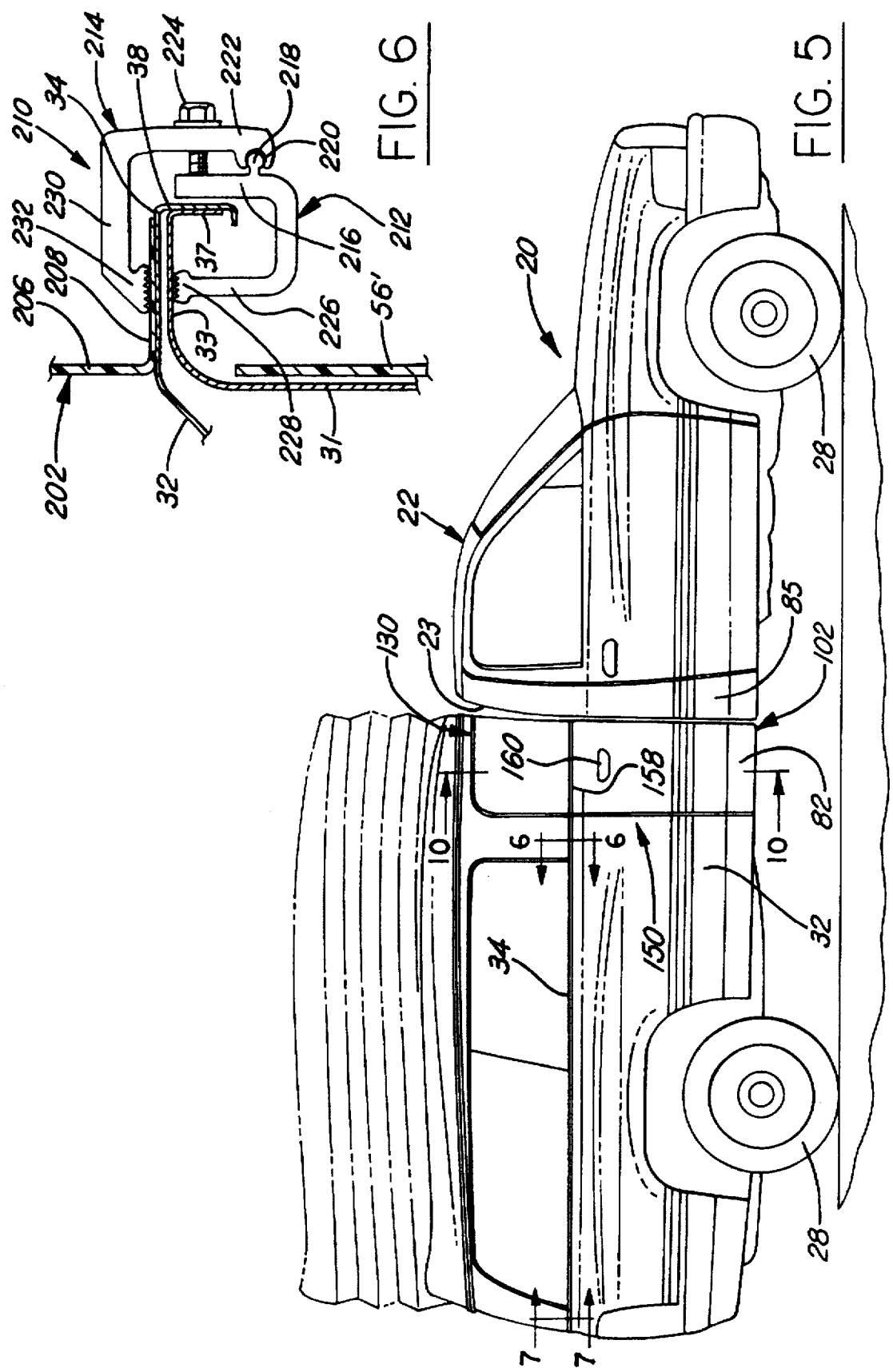

BEDLINER CONVERSION UNIT FOR PICKUP TRUCK

FIELD OF THE INVENTION

This invention relates to pickup truck conversions and, more particularly, to a bedliner conversion unit for a pickup truck long cab frame, modified to support a regular cab, wherein a predetermined chassis frame clear length is defined between the cab rear wall and an open front end of the cargo bed.

BACKGROUND OF THE INVENTION

With the increased popularity of pickup trucks, vehicle manufacturers are continually seeking ways to offer a maximum number of optional truck layouts for their customers at a minimum of cost. A desirable customer option for a pickup truck, such as a Dodge Ram T-300 for example, would be an extra-long ten foot cargo bed, in addition to the presently offered short and long cargo beds, having lengths of six and a half and eight feet, respectively. Producing a pickup truck with an extra-long cargo bed in a conventional manner, however, would be relatively costly considering the low volume projections.

SUMMARY OF THE INVENTION

Accordingly, it is a feature of the present invention to fulfill the above need by providing a conversion unit for a pickup truck, utilizing a chassis frame designed for supporting a long-cab, modified to support a regular cab, thereby creating a predetermined chassis frame clear length between the cab rear wall and the forward open end of a modified cargo bed. The conversion unit includes a plastic bedliner portion, adapted for insertion in the modified cargo bed, and a self-supporting, integral, forward extension portion, adapted for attachment to the frame clear length, wherein the extension portion is closed by an integral front panel.

It is another feature of the invention to provide a metal reinforcing framework incorporated with an integral plastic extension portion, wherein the framework is adapted to be secured to the chassis frame clear length.

It is yet another feature of the invention to provide the conversion unit plastic extension portion with a structurally rigid reinforcing framework that is embedded in the conversion unit plastic extension portion by having the plastic material molded around the framework.

It is another feature of the invention to provide the conversion unit extension portion with a passenger lower-half side access opening, adapted for closure by a lower hatch swingably supported on the extension portion framework, and whereby the hatch exterior panel is contoured to blend with adjacent truck cab and cargo bed exterior body skin.

It is still another feature of the invention to provide the conversion unit forward extension portion framework with a side step sub-frame, wherein a longitudinally extending outboard sub-frame brace of the side step swingably supports a lower edge of a downwardly opening hatch adapted for closure of the side access lower-half opening.

It is yet another feature of the invention to provide a removable camper shell adapted for enclosing the conversion unit, wherein the shell has an upper-half side access opening in mating vertical alignment with the conversion unit lower-half side access opening defining a full height access opening, and wherein the upper-half opening is adapted for closure by an upwardly opening hatch having its upper edge swingably supported to a shell side wall, such that the downwardly opening lower hatch and the upwardly opening upper hatch define a clam-shell type double-hatch closure for the full height access opening.

It is a still further feature of the invention to provide the conversion unit camper shell and expandable roof cap assembly, wherein with the roof cap expanded, in combination with the double-hatch closure, offering a side access full height opening with sufficient headroom to enable a six-foot person to enter and exit the enclosure assembly removably mounted on the conversion unit.

It is still another feature of the present invention to provide a conversion unit wherein the side access downwardly opening lower hatch has a bottom edge swingably supported about a horizontal axis to the side step sub-frame, between an upright closed position and a downwardly and outwardly inclined open position, whereby with the upper edge portion of the lower hatch being pivoted into contact with on the ground, such that a stairway on the interior of the lower hatch, together with the side step, allows easy boarding of the unit.

These and other features and advantages of the invention will be more fully understood from the following detailed description of the invention taken together with the accompanying drawings.

BRIEF DESCRIPTION OF THE DRAWINGS

In the drawings:

FIG. 5 is a side view of the camper shell and expandable roof cap assembly of FIG. 3, shown mounted on the pickup truck, with expanded roof cap shown in phantom lines;

FIG. 6 is a fragmentary vertical sectional view taken on the line 6—6 of FIG. 5;

DETAILED DESCRIPTION OF THE INVENTION

Figure 1:
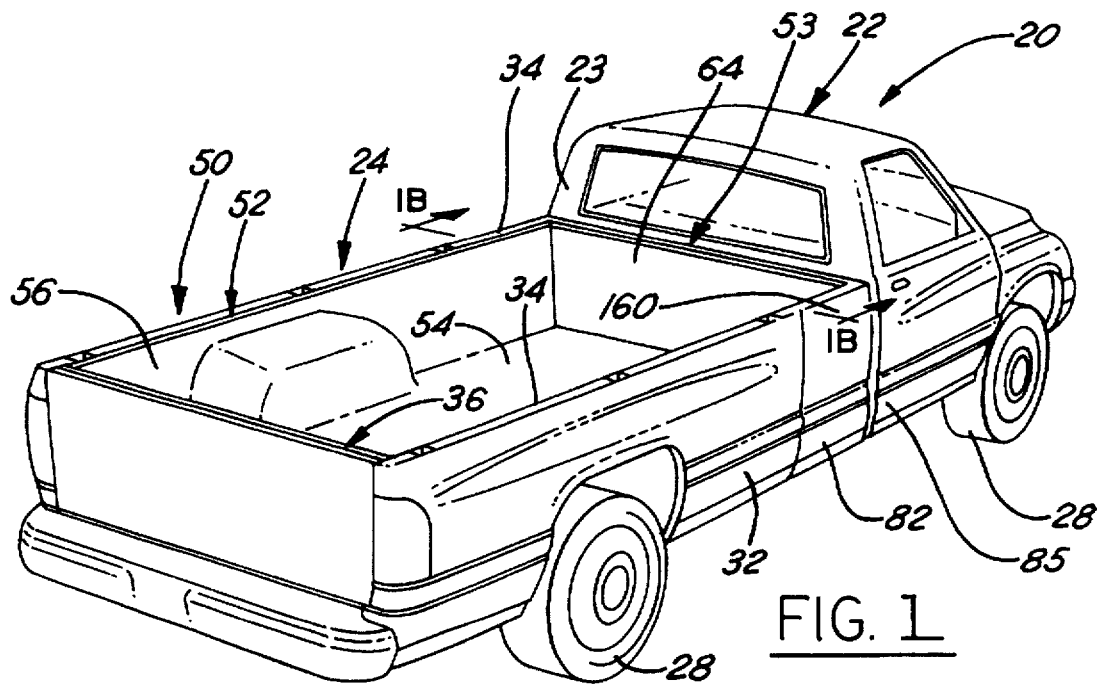
FIG. 1 is a perspective view of a pickup truck with a modified truck bed, supporting a conversion unit in accordance with one form of the present invention.

Referring now to the drawings, a first embodiment of the conversion unit of the present invention is shown in FIGS.

1, 1A, and 1B while a second embodiment of the conversion unit is shown in FIGS. 2–12. It will be noted at the outset that both embodiments of the invention may be used in combination with a single modified pickup truck, generally indicated by numeral 20. Accordingly, the same reference numerals will be used throughout the specification and drawings to describe the various elements of the pickup truck. Further, both bedliner conversion unit embodiments are identical, except for a side access arrangement provided in the right side of the second embodiment. Accordingly, the same reference numerals will be used throughout the description and drawings to describe the same or corresponding elements of the units, except that the numerals are primed.

With reference to FIG. 1 of the first embodiment, numeral 20 generally indicates a pickup truck, modified in accordance with the present invention, including a regular cab 22 having a cab rear wall 23 spaced a predetermined longitudinal dimension from an open front end of a cargo bed 24. As used in the present application, the term "regular cab" means a conventional pickup truck cab that lacks space for rear passenger seating.

Figure 1A:
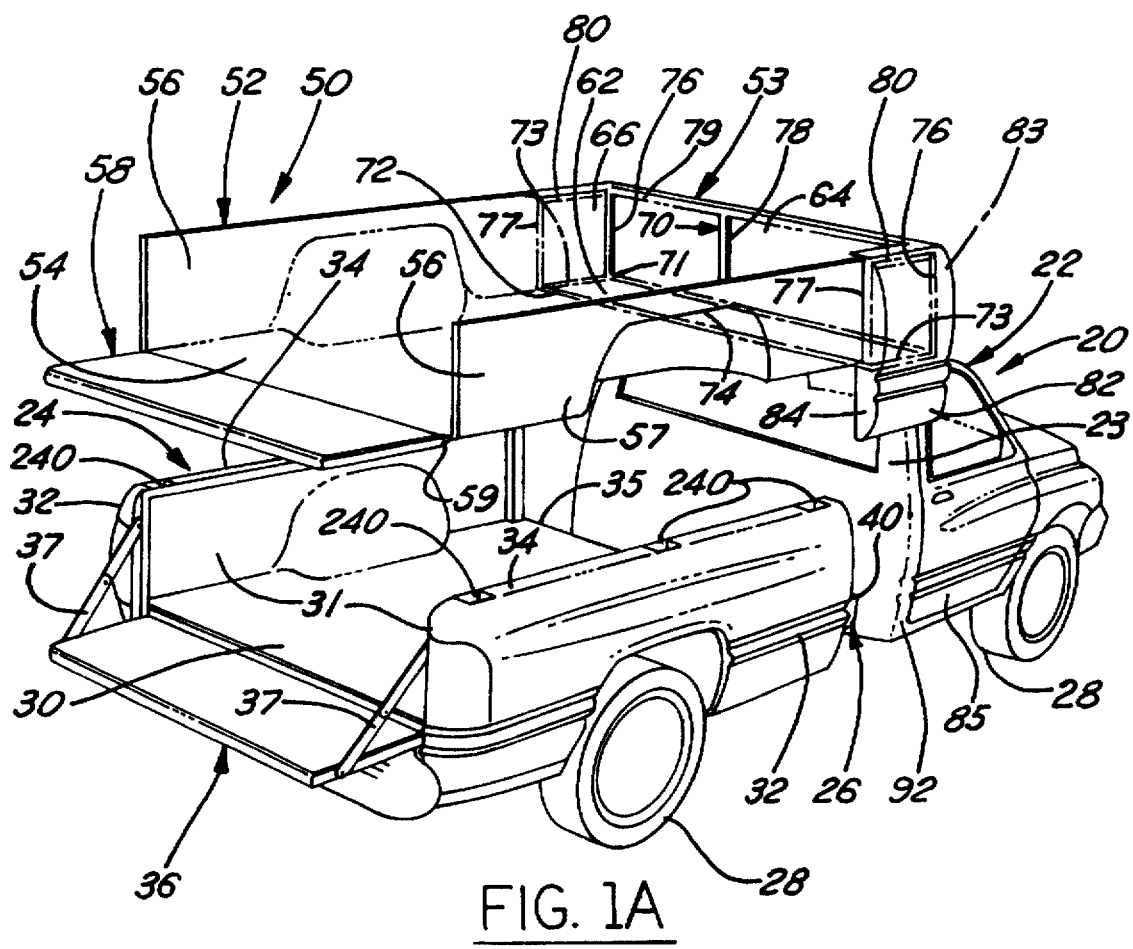
FIG. 1A is an exploded perspective view of the pickup truck and conversion unit of FIG. 1.
Figure 1B:
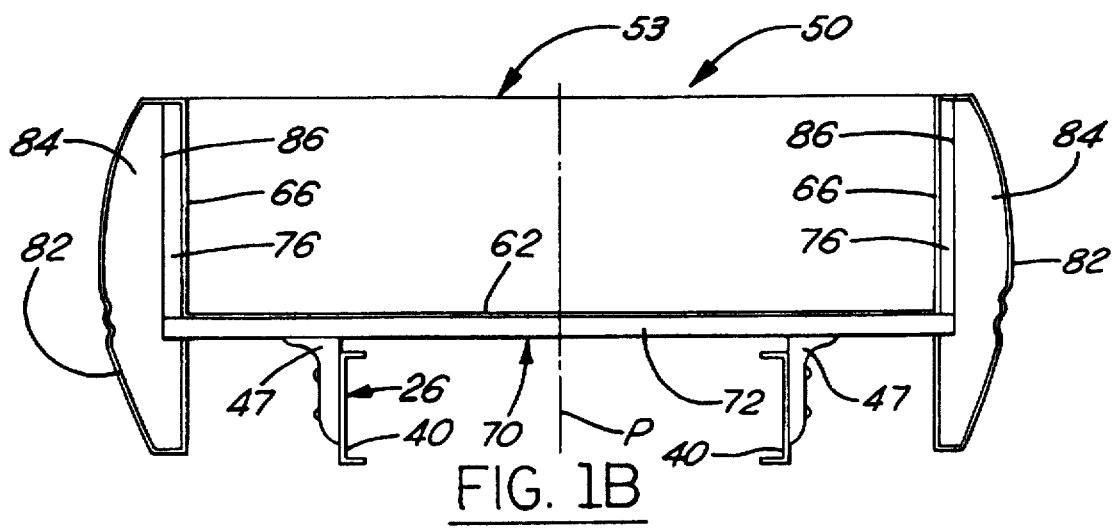
FIG. 1B is a transverse sectional view taken on the line 1B—1B of FIG. 1.

In FIGS. 1, 1A, and 1B, the cab 22 and the cargo bed 24 are both shown secured to a "long-cab" pickup truck chassis frame 26, supported on wheels 28. In automotive parlance, the terms "long-cab", "extended cab", and "third door cab" all refer to pickup truck cabs having a rear area which includes one or more rear passenger seats adapted for folding out of the way to increase cargo space. One example of a pickup truck long-cab is shown in U.S. Pat. No. 4,771,507, issued Sep. 20, 1988, to Draplin et al. An example of a third door cab is shown in U.S. Pat. No. 4,930,836, issued Jun. 5, 1990, to Grinn. It will be noted that the extended length chassis frame 26 of the present invention, designed to normally support the combination of a long-cab with an eight foot cargo bed, is readily modified by repositioning certain frame brackets to accommodate the regular cab 22.

Figure 7:
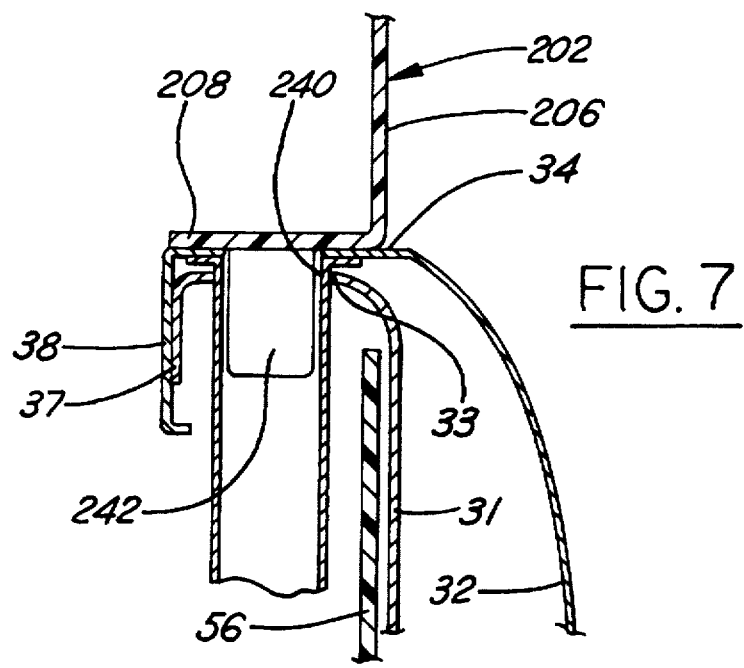
FIG. 7 is fragmentary, vertical sectional view taken on the line 7—7 of FIG. 5.

With reference to FIG. 1A, the cargo bed 24 includes a sheet metal bed floor 30, a pair of opposing interior sheet metal side walls 31, and a pair of opposite sheet metal exterior side skins 32. As seen in FIGS. 6 and 7, each interior side wall 31 extends up from the floor 30 and terminates in an inwardly extended top flange 33, while each exterior side skin 32 terminates in an inwardly extended top rail 34. As the cargo bed 24 has been modified by removing its front wall, bed floor 30 is shown terminating at its forward open end in a transverse edge 35. The cargo bed 24 has a conventional open aft end adapted to be closed by a swing-down tailgate 36, swingably mounted to the rear edge of floor 30 for pivotal movement about a transverse axis. A pair of toggle links assemblies 37 are shown supporting the tailgate 36 in its open position. It will be noted in FIGS. 6 and 7 that each top flange 33 and its associated top rail 34 terminate in down-turned flange portions 37 and 38 respectively, having their opposed abutting surfaces spot welded.

Figure 8:
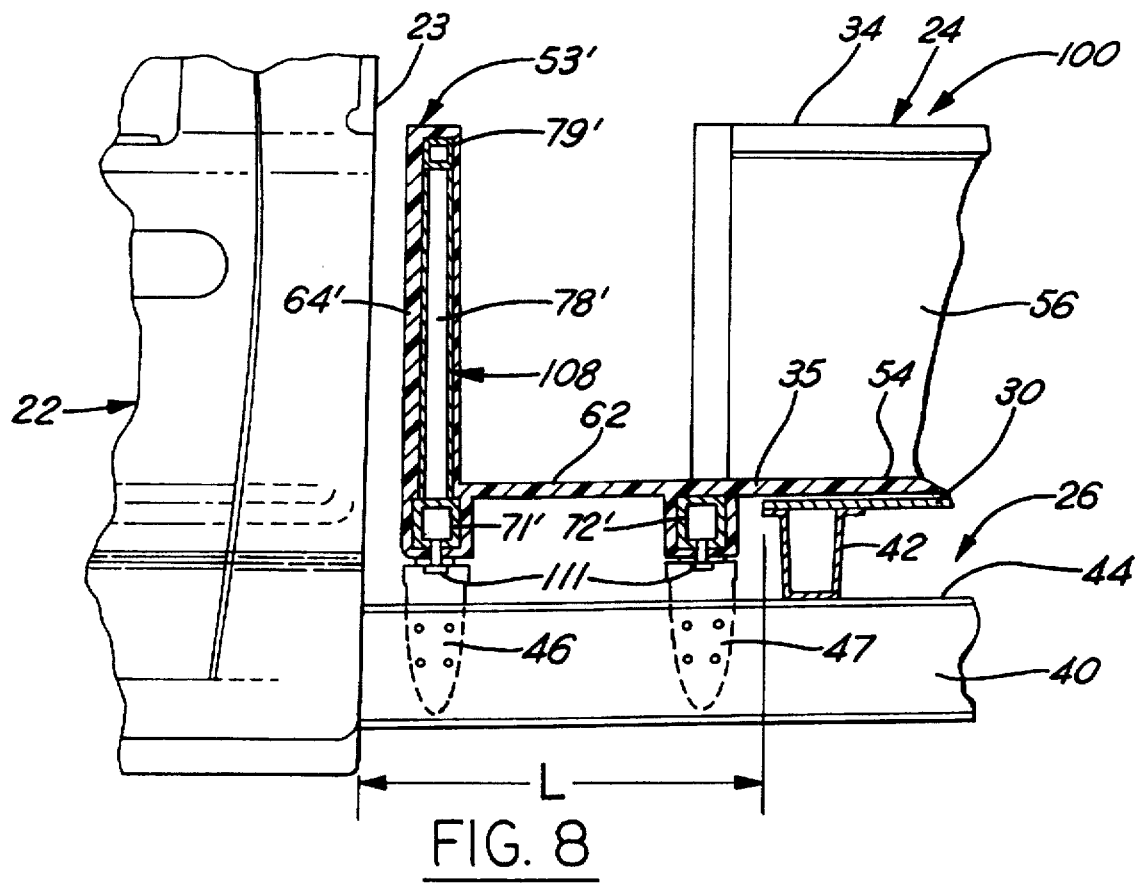
FIG. 8 is an enlarged fragmentary longitudinal sectional view taken on the line 8—8 of FIG. 2.

With reference to FIGS. 1A and 1B, the chassis frame 26 includes a pair of longitudinally extending, open channel, side beams 40 interconnected by a plurality of crossbeams. In FIG. 8 there is shown a typical crossbeam 42, supported on side beam upper edge 44. Each side beam 40 has a pair of fore 46 and aft 47 frame brackets fixed thereto, adapted for mounting a conversion unit of the present invention.

Referring to FIG. 1A, numeral 50 generally indicates a first conversion unit embodiment, which includes a plastic bedliner portion 52 and a forward composite extension portion 53. The bedliner portion 52, sized for insertion in the cargo bed 24, includes a liner bottom panel 54, a pair of upstanding opposed liner side panels 56, and a tailgate liner rear panel 58. While the tailgate panel 58 is shown secured to the bottom panel 54 by a living hinge integral web 59, the tailgate panel 58 may also be a separate member secured to the interior of the tailgate 36. It will be noted in FIG. 1B that the conversion unit 50 is symmetrically disposed about a longitudinally extending, vertically disposed plane that includes the dashed construction line "P", which line intersects the longitudinal centerline of the truck 20.

As seen in FIG. 1A, the chassis frame space is adapted to support forward integral plastic extension portion 53, which includes a bottom panel portion 62 extended from bottom panel 54, an upstanding front panel 64, and a pair of side panel portions 66 extended from associated side panels 56. The extension portion 53 incorporates a self-supporting reinforcing steel framework, generally indicated at 70. In the preferred form of the invention the framework 70 is embedded in the plastic extension portion 53 by having the plastic material molded therearound. A vacuum forming molding operation may be used, for example, involving suitable structural thermoplastic fiberglass material, or the like.

Figure 4:
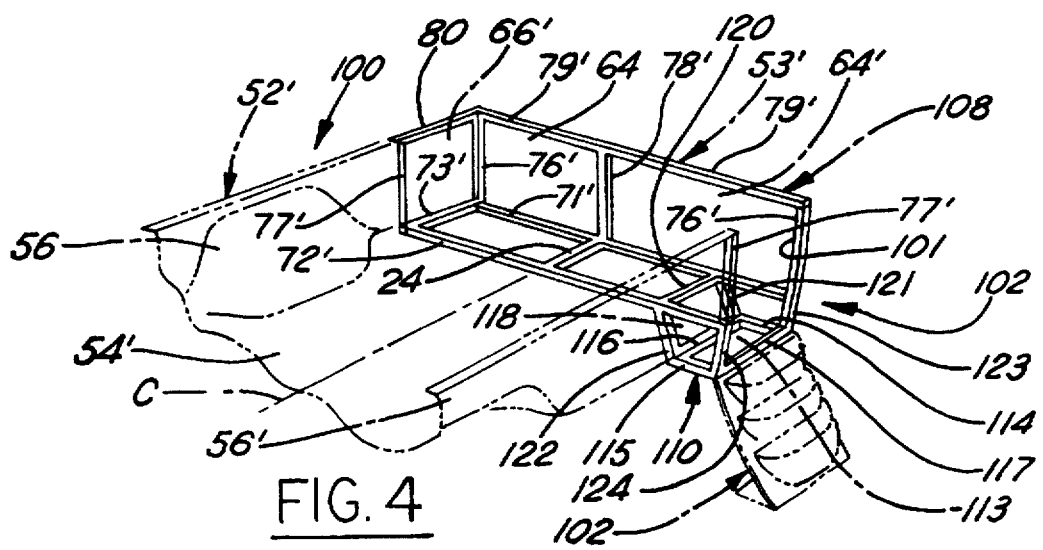
FIG. 4 is a fragmentary perspective view, partly in phantom lines, showing the embedded reinforcing framework of the forward extension portion of the conversion unit of FIG. 3.

As seen in FIGS. 1A, 4, and 8, the generally rectangular rigid framework 70 includes forward 71 and aft 72 box-section crossbeams interconnected, as by welding, at their free ends by an associated outboard, longitudinally extending framework joist 73 and an intermediate framework joist 74. Each outboard end of the forward crossbeam 71 is welded to a lower end of an associated box-section forward post 76, while each outboard end of the aft crossbeam 72 is welded to a lower end of an associated aft post 77. Each forward post upper end, together with an upper end of a forward center post 78, is welded to a transversely extending box-section, upper front rail beam 79. A pair of longitudinally extending upper side rail beams 80 each has a forward end welded to the upper end of an associated forward post 76 and an aft end welded to the upper end of an associated aft post 77.

FIG. 1B shows the self-supporting extension portion 53 provided with a pair of opposite, exterior sheet metal side panels 82 suitably secured, as by welding, on associated fore 83 and aft 84 pairs of gusset plates. Each gusset plate has its inboard edge secured, as by welding, to an associated one of the forward 76 and aft 77 posts. As observed in FIG. 1, the exterior side panels 82 are contoured to blend in flush relation with their associated adjacent cab 85 and cargo bed 86 sheet metal exterior body skins.

Thus, as seen in FIG. 8, upon the conversion unit extension portion being mounted to the chassis frame 26 it occupies the frame clear length "L" between the cab rear wall 23 and the cargo bed floor front edge 35. As a result, the conversion unit 50 provides an extra-long one-piece composite bed having an overall length of about ten feet, including the eight foot bedliner portion 52 and the extension portion 53 length of the order of 20 to 24 inches.

Figure 3:
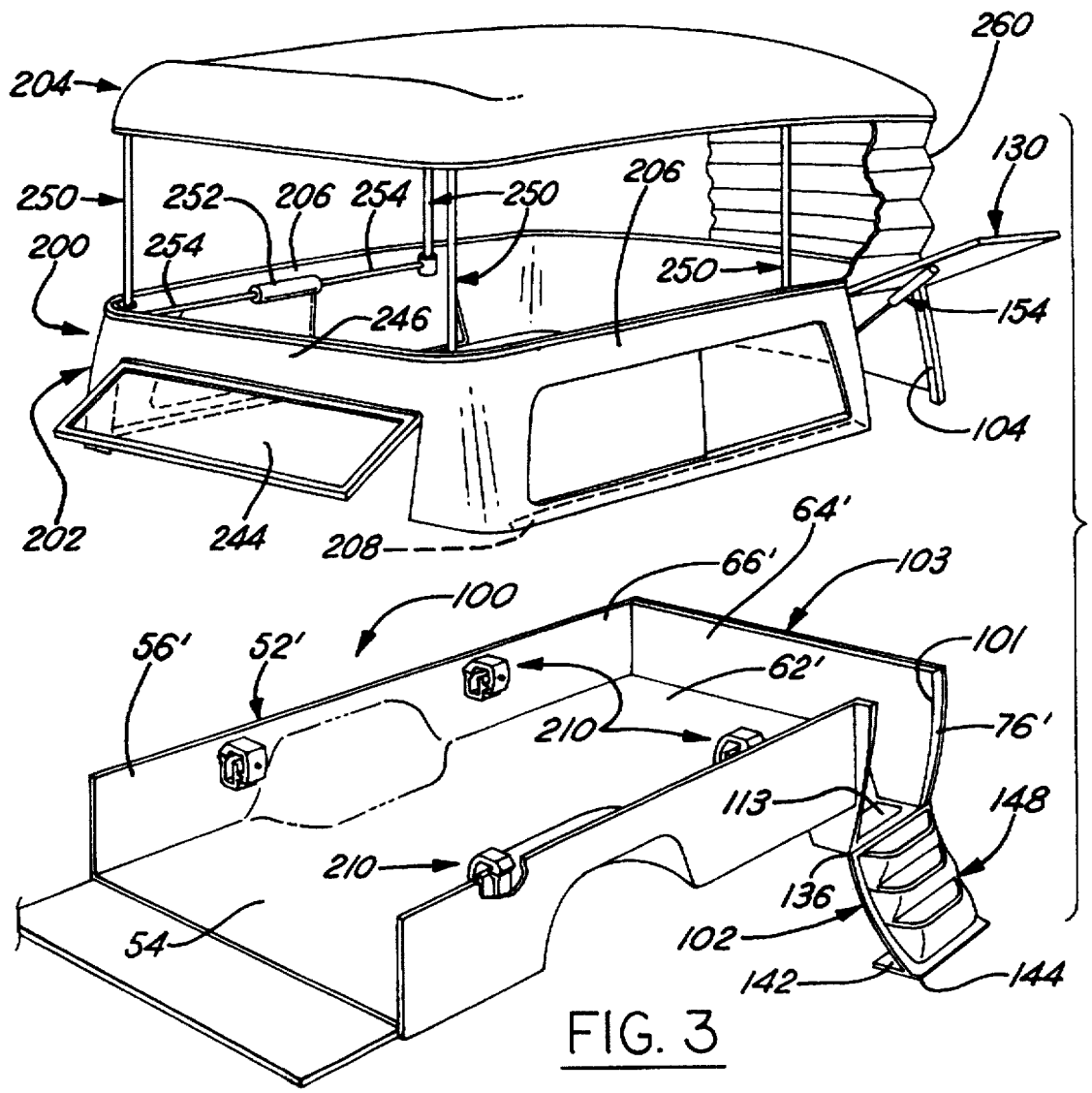
FIG. 3 is an exploded perspective view, with portions broken away, of a second embodiment of the conversion unit adapted for supporting a mating camper shell and expandable roof cap assembly.

Turning now to the second embodiment of the invention wherein a conversion unit, indicated generally at 100 in FIG. 3,is identical to the first embodiment 50 except for a rectangular-shaped, side access lower-half opening 101, adapted for closure by door means in the form of a lower hatch 102. The lower hatch opening 101, provided in the right side of the conversion unit extension portion 103, is adapted to combine with a rectangular-shaped, upper-half opening 104 on the right side of a camper shell, described below.

Referring to FIG. 4, it will be observed that a second embodiment framework 108 has a left hand side, defined by construction line "C", that is identical to the framework 70, while a modified right hand side includes a side step sub-frame, generally indicated at 110. As seen in FIG. 8, the framework 108 of the conversion unit 100 is mounted on the chassis frame 26 by its forward 71' and aft 72' box-section crossbeams, which are secured by bolts 111 to associated forward 46 and aft 47 pair of frame brackets. It will be noted that first embodiment conversion unit 50 has its framework crossbeams 71 and 72 secured to the chassis frame 26 in the identical manner as the second embodiment conversion unit 100.

FIG. 8 shows a center post 78' of framework 108 having its lower end welded to the midpoint of forward crossbeam 71' and its upper end welded to the midpoint of upper box-section rail beam 79'. The intermediate post 78' is shown embedded in the front panel 64' by being molded therearound by the plastic material of conversion unit front panel 64'.

As seen in FIG. 4, the lower-half access opening 101 is partly defined by the sub-frame 110 suspended from the right hand fore and aft end portions of the framework forward 71' and aft 72' crossbeams. The sub-frame 110 includes a longitudinally extending, downwardly offset rectangular frame supporting a side step, shown at 113 in FIG. 3. The side step sub-frame includes a pair of fore 114 and aft 115 transverse struts joined at one end by an inboard longitudinally extending brace 116 and at their other end by an outboard longitudinally extending brace 117.

A step riser 118 is shown in FIG. 4 supported by a longitudinally extending frame joist 120 connected inboard between the fore 71' and aft 72' crossbeams. The riser 118 is further supported by a pair of fore 121 and aft 122 angled struts which extend downwardly and outwardly from each fore and aft end of the joist member 120, with their lower ends welded to associated ends of the inboard step brace 116. A pair of forward 123 and aft 124 hangers, with their upper ends welded to outboard ends of associated forward 71' and aft 72' crossbeams, have their lower ends welded to associated ends of the step outboard brace 117. As seen in FIG. 3, the side step 113, offset downwardly and outwardly from the extension bottom panel portion 62', permits easy access into the conversion unit.

As illustrated in FIG. 3, the lower-half opening 101 and the upper-half opening 104 define a full height opening adapted for closure by the lower hatch 102 together with an upper hatch 130. The lower hatch 102, as seen in FIG. 9, is swingably supported at its lower end 134 by a hinge 136 for pivotal movement about a horizontal axis from an upright closed FIG. 10 mode to a downwardly open mode.

Figure 10:
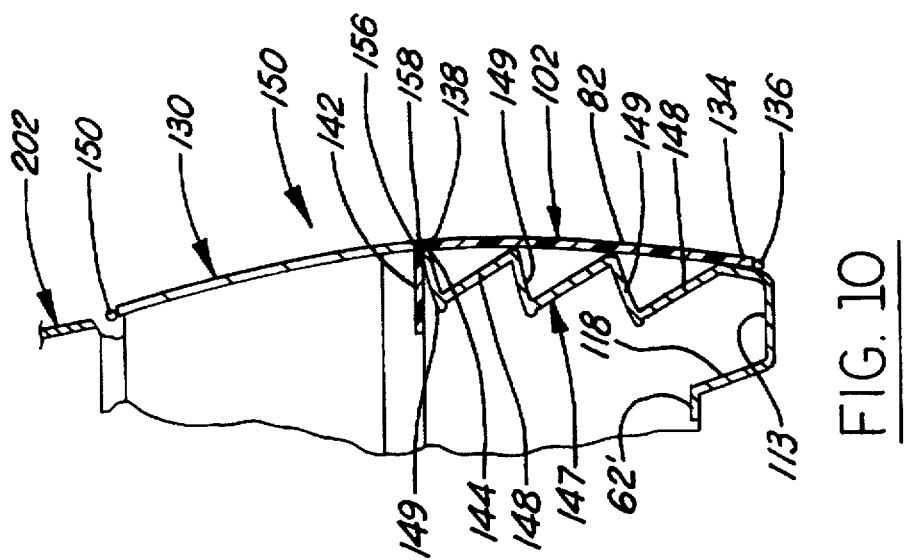
FIG. 10 is an enlarged fragmentary transverse sectional view, taken on the line 10—10 of FIG. 5, showing the double-hatch closure in its closed mode.
Figure 9:
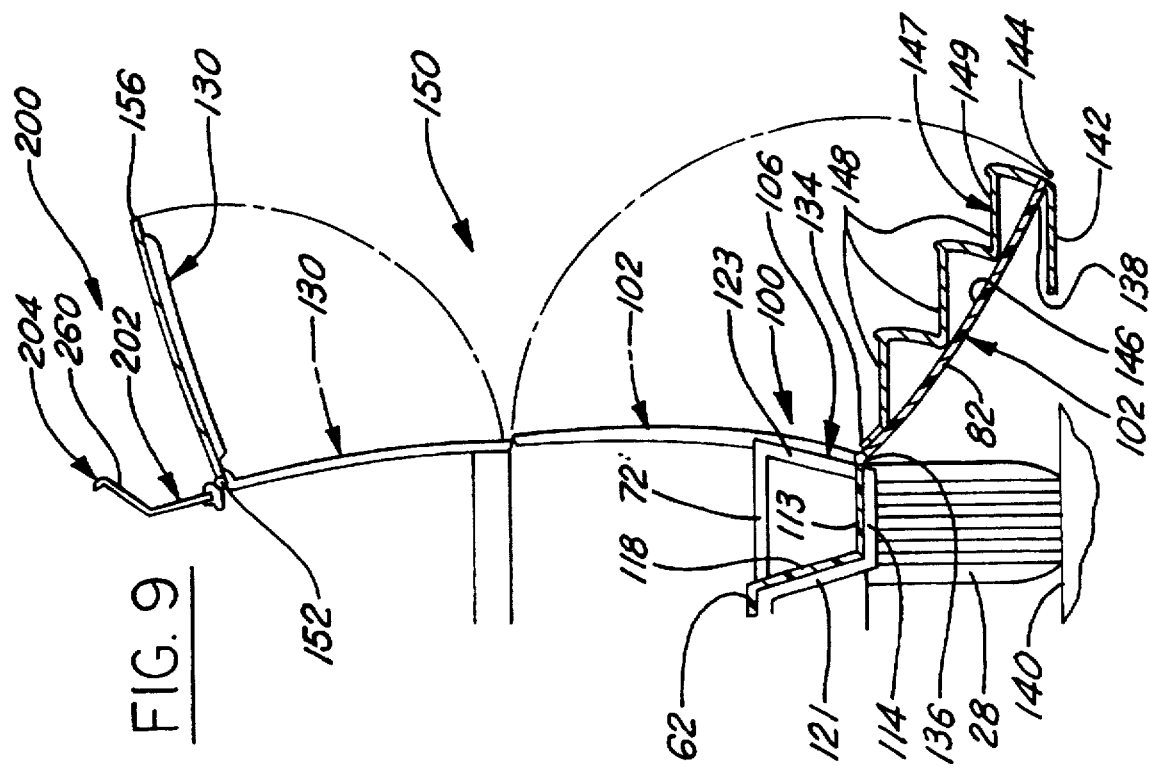
FIG. 9 is an enlarged fragmentary transverse sectional view, partly in elevation, taken on the line 9—9 of FIG. 2, showing the double-hatch closure in its open mode.

FIG. 9 shows the lower hatch 102 in its downwardly open mode, wherein it extends laterally outward and downward, with its upper end 138 contacting the ground 140 at an acute angle of the order of 35 degrees. A rubber pad 142, hinged at 144 to the lower hatch upper end 138, is adapted to pivotally fold in one direction under the lower hatch providing a ground adhering base for the lower hatch. The lower hatch exterior plastic panel 85 has its inner surface 146 molded with a plastic stairway 147 so that a rigid structural hatch is defined. The stairway 147, which includes three steps 148 and three integral risers 149, combines with the side step 113 in the lower hatch downwardly open mode facilitating boarding of the conversion unit. FIG. 10 shows the lower hatch in its closed mode, wherein the pad 142 is pivoted in the opposite direction about the hinge 144 to a horizontally disposed inboard extending stored location, juxtaposed its associated riser 149.

Figure 2:
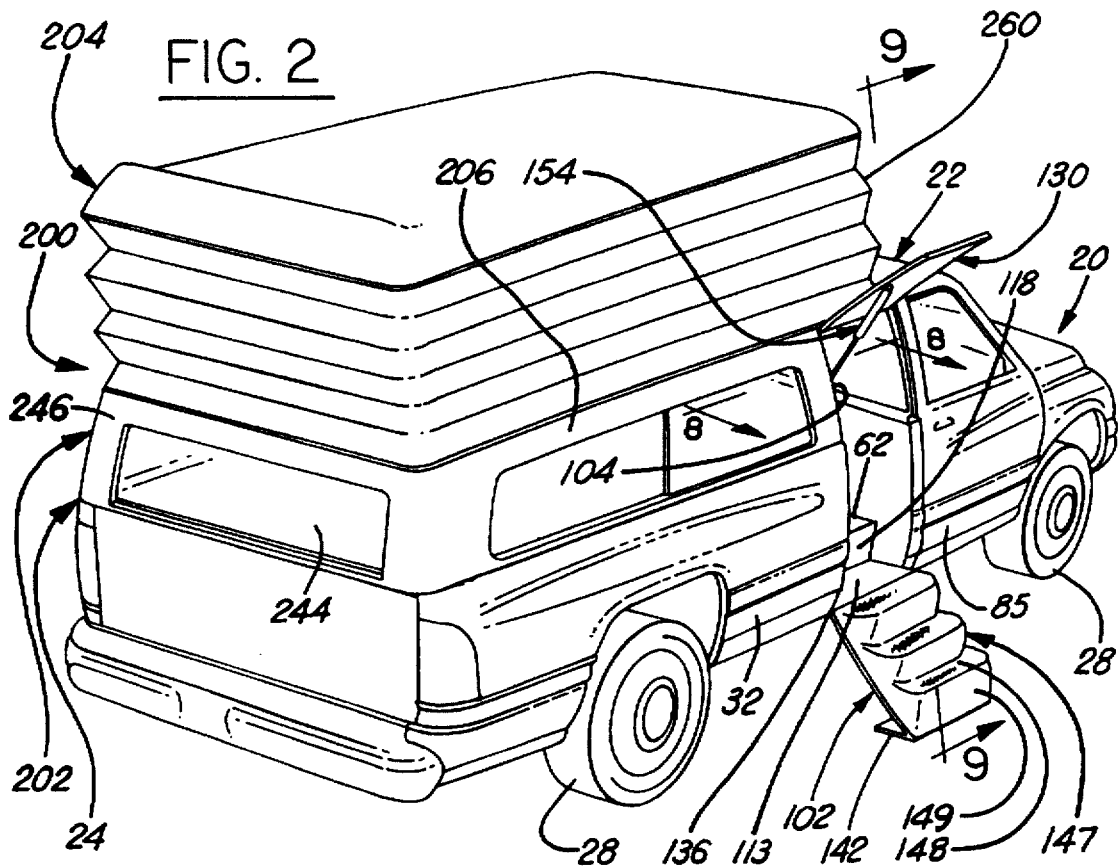
FIG. 2 is a perspective view showing the pickup truck and conversion unit of FIG. 1, provided with a camper shell and expanded roof cap assembly, with the side access clam-type hatch in its open mode.

It will be noted in FIG. 9 that the lower hatch 102 is adapted to combine with the upper hatch 130 to provide a clam-shell type double-hatch closure 150. The upper hatch 130 has its upper end supported by hinge 152 for swingable movement about a horizontal axis from its upwardly open position to a downstanding closed position in the upper-half opening 104, shown in FIG. 10. As seen in FIG. 2, the upper hatch 130 is adapted to be supported in its upwardly open position by a suitable hold-open mechanism, such as a conventional gas spring prop 154. In the upper hatch closed position a lower shut-face edge 156 of the upper hatch 130 abuts against the rubber pad 142, defining a horizontal sealed parting line, shown at 158 in FIG. 5. The lower hatch panel 85 has an exterior recessed handle 160 for operating a conventional latch assembly to maintain the upper 130 and lower 102 hatches in a closed generally flush position with adjacent cab 85 and cargo bed 32 exterior body skins.

Referring to FIG. 3, numeral 200 generally indicates an add-on enclosure assembly, including a camper shell 202 and an expandable cap 204 of structural plastic material, wherein the enclosure assembly extends over the length and width of the conversion unit 100. The shell side walls 206 are each molded with an inwardly extending base flange 208 wherein the right side base flange is shown in FIG. 6 extending over its associated cargo bed top rail 34.

A conventional clamping assembly, generally indicated by numeral 210 in FIG. 6, includes a U-shaped lower clamp-half 212 and an angle-shaped upper clamp-half 214. An upstanding inboard leg 216 of the lower clamp-half is formed with a horizontally extending cylindrical-shaped bar portion 218 received in a complementary rotational journal 220 integrally formed on downstanding leg 222 of the upper clamp-half. The downstanding leg 222 has a vertically disposed slot through which a bolt 224 extends for reception in a threaded bore in the upstanding inboard leg 216 of the lower clamp-half 212.

Outboard upstanding leg 226 of the lower clamp-half 212 has a lower jaw 228 on its upper end engaging the underside of interior bed wall inwardly extending flange 33. The upper clamp-half has an outwardly extending leg 230 terminating in an upper jaw 232 engaging the camper shell base flange 208 in vertically opposed relation to the lower jaw 228. Upon tightening the bolt 224, the lower clamp-half is pivoted clockwise about the horizontal axis of the bar portion 218, thereby drawing the jaws 228 and 232 together and clamping the camper shell flange 208 into contact with the top rail 34. It will be seen in FIG. 3 that the conversion unit 100 has a plurality of clamping assemblies 210 on each side for clamping the removable camper shell inwardly extending base flange 208 to the bed upper rail 34.

Referring to FIG. 1A, each top rail 34 of the cargo bed 24 is provided with a plurality of vertically disposed, longitudinally extending stake sockets 240. In FIG. 7 it will be seen that each camper shell side wall base flange 208 has its underside formed with a plurality of integral, downwardly projecting lugs 242, adapted for insertion in an associated one of the stake sockets 240. Upon the camper shell 200 being initially located on the cargo bed 24, each of the lugs 242 is received in an associated one of the sockets 240. It will be appreciated that the engaged lugs 242 are designed to resist the lateral loads applied to the camper shell. Further, the lugs are of a predetermined longitudinal dimension relative to the stake slots whereby the lugs allow for longitudinal thermal expansion of the plastic camper shell 200 relative to the cargo bed metal top rails 34. It will be noted that the camper shell 202 has a lift gate rear window 244 swingably supported at its upper edge to rear wall 246 of the shell.

With reference to FIG. 3, the expandable cap 204 is shown in its elevated position supported by left and right pairs of vertical screw jacks 250, with one screw jack of each pair mounted at an aft corner of the shell 202, and the second screw jack of each pair mounted on a shell side wall 206 slightly aft of the cargo bed forward edge 35. Each left and right pair of screw jacks 250 are operably connected to a common electric motor 252, supported at a central location on each shell side wall 206, by an associated, horizontally disposed, drive shaft 254. It will be noted that each electric motor 252 includes a current limit switch, while the drive shafts lengths to all four screw jacks 250 are of equal length.

A flexible plastic enclosing material 260, which completely encircles the cap 204, has its upper edge attached to a peripheral edge of the cap while its lower edge is attached to upper edge of the camper shell. The enclosing material 260, which is formed in a conventional accordion style, maintains a continuous exterior surface between the expandable cap and the shell when the top is raised.

Although the invention has been described by reference to certain specific embodiments, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A conversion unit for a modified pickup truck supporting a cab and cargo bed on a chassis frame, defining a predetermined frame clear length between the cab and an open front end of the bed, the conversion unit comprising:

a plastic bedliner portion, defined by a bottom panel and opposed side panels, and an integral self-supporting, forward extension portion, defined by an extended bottom panel portion and extended opposed side panel portions closed by an upstanding front panel, said bedliner portion adapted for insertion in the cargo bed and said extension portion, incorporating framework means, adapted for mounting on the chassis frame clear length;

attachment means adapted for securing said framework means to the frame clear length, and an exterior side panel, supported on each outboard terminus of said extension portion, whereby each said exterior side panel is contoured to blend with its associated adjacent cab and cargo bed exterior body side skins.

2. The conversion unit as set forth in claim 1 wherein said framework means comprises a plurality of metal crossbeams secured to said extension portion, and said attachment means are adapted for securing said crossbeams to the frame clear length.

3. The conversion unit as set forth in claim 2 wherein each said crossbeam is juxtaposed with an undersurface of said extended bottom panel portion, and plastic material, integral with said extended bottom panel portion, is molded around each said crossbeam.

4. The conversion unit as set forth in claim 1 wherein said framework means is formed of metal and embedded in said plastic extension portion.

5. The conversion unit as set forth in claim 1 wherein at least one side panel extended portion and its associated exterior side panel define an extension portion side access, lower-half opening adapted for closure by side closure means swingably supported on said framework means.

6. The conversion unit as set forth in claim 5 wherein said side closure means comprises a lower side hatch adapted for opening downwardly having a lower edge swingably supported on said framework means for outward swinging movement about a horizontal axis between a downwardly open position and an upstanding closed position and, with said lower side hatch in its closed position, having an upper edge even with an associated longitudinally extending top rail of the cargo bed.

7. The conversion unit as set forth in claim 6 wherein said framework means comprises a pair of forward and aft crossbeams adapted to be secured to the chassis frame clear length, one outboard end portion of each said crossbeam supporting a side step sub-frame, said sub-frame having a side step extending longitudinally of the truck and offset downwardly a predetermined dimension from said conversion unit extended bottom panel portion.

8. The conversion unit as set forth in claim 7 wherein said side step sub-frame includes a longitudinally extending side brace supporting an outboard marginal edge of said side step, and a lower edge of said side hatch swingably supported on said outboard brace.

9. The conversion unit as set forth in claim 8 wherein in its open position said side hatch slopes laterally outwardly and downwardly from said side step such that an upper horizontal edge of said side hatch contacts the ground, and wherein an interior surface of said side hatch panel supports stairway means for use in cooperation with said side step, thereby enabling a person to easily enter and exit said conversion unit via said side access opening.

10. The conversion unit as set forth in claim 6 wherein said side hatch exterior surface is contoured to form a continuous transition surface with associated adjacent cab and cargo bed exterior body side skins.

11. The conversion unit as set forth in claim 1 wherein said framework means comprises a welded steel framework.

12. The conversion unit as set forth in claim 3 wherein said crossbeams comprise a pair of forward and aft crossbeams and said forward crossbeam has outboard ends, each connected to a lower end of an associated framework upright forward post, and wherein a framework transverse upper front rail beam has outboard ends connected to an upper end of an associated forward post, and wherein said aft crossbeam has outboard ends connected to a lower end of an associated framework upright aft post, and at least one longitudinal upper framework side rail beam has a forward end connected to an upper end of an associated forward post, and an aft end connected to an upper end of an associated aft post.

13. The conversion unit as set forth in claim 6 wherein a four sided, rectangular plastic camper shell and expandable roof cap enclosure assembly is adapted for mounting on the conversion unit so as to extend over the length and width thereof, and wherein opposed side walls of said shell extend downwardly from said roof cap terminating in oppositely extending marginal side base flanges, such that each said base flange is adapted for matched positioning on an associated cargo bed longitudinally extending top rail, and a plurality of clamp assemblies are adapted for clamping each said side base flange on its associated top rail.

14. The conversion unit as set forth in claim 13 wherein each said base flange has its undersurface formed with a plurality of downwardly extending lugs, each said lug adapted for insertion in an associated top rail stake pocket having a dimension, and wherein each said lug has a dimension less than its associated stake pocket dimension, whereby each said shell plastic base flange is adapted for slidable movement, relative to its associated metal top rail, upon thermal expansion thereof.

15. The conversion unit as set forth in claim 9 wherein said side hatch upper horizontal edge has an elastomeric pad hinged thereto, wherein with said lower hatch in its downwardly open position said pad is adapted to be pivoted in one direction so as to contact the ground while underlying said lower hatch, thereby providing a ground adhering base therefore.

16. The conversion unit as set forth in claim 13 wherein one of said camper shell side walls has an upper-half opening in vertical matched alignment with said conversion unit lower-half opening, thereby defining a full height opening, said upper-half opening adapted for closure by an upwardly opening upper hatch having an upper edge swingably supported on said shell side wall, said lower and upper hatches combining to define a double-hatch closure, whereby with each hatch in its open position and said roof cap expanded, said full height opening provides sufficient headroom enabling a six-foot person to enter and exit said enclosure assembly.

17. A conversion unit for a modified pickup truck supporting a cab and cargo bed on a chassis frame, defining a predetermined frame clear length between the cab and an open front end of the bed, the conversion unit comprising:

a plastic bedliner portion, defined by a bottom panel and opposed side panels, and an integral self-supporting, forward extension portion, defined by an extended bottom panel portion and extended opposed side panel portions, said bedliner portion adapted for insertion in the cargo bed and said extension portion, incorporating framework means, adapted for mounting on the chassis frame clear length; and attachment means adapted for securing said framework means to the frame clear length.

* * * * *